USO05299122A

United States Patent [19]
Wang et al.

[11] Patent Number: 5,299,122
[45] Date of Patent: Mar. 29, 1994

[54] TABLE MANIPULATIONS FOR ENTERPRISE SPECIFIC SEARCH TERMS

[75] Inventors: Diana S. Wang, Trophy Club, Tex.; Charles M. N. Cree, Boeblingen, Fed. Rep. of Germany

[73] Assignee: International Business Machines Corporation, Armonk, N.Y.

[21] Appl. No.: 800,866

[22] Filed: Nov. 26, 1991

Related U.S. Application Data

[63] Continuation of Ser. No. 453,542, Dec. 20, 1989, abandoned.

[51] Int. Cl.⁵ .............................................. G06F 15/40
[52] U.S. Cl. .................................. 364/419.1; 395/600
[58] Field of Search ................. 364/419; 395/600, 650

*Primary Examiner*—Gail O. Hayes
*Attorney, Agent, or Firm*—David A. Mims, Jr.

[57] ABSTRACT

This invention relates to a method of dynamically changing tables used for the generation of user specific index terms in a document interchange system. The tables supply such things as validation rules, synonym provisions, and standardization information and must be easily changed to reflect the changing needs of the user. This invention provides the INSTALL, FETCH, and UNINSTALL commands to meet this need. The INSTALL command permits quick installation to tables while the UNINSTALL command provides for their removal. Users are permitted to copy and view the tables through use of the FETCH command. The commands provide a method of altering tables to meet the vary needs of the user.

7 Claims, 5 Drawing Sheets

```
COMMAND          OPERANDS
INSTALL          IDENTIFIED-DATA,
                 OBJECT-KEY,
                 OBJECT-TYPE,
                 [,TARGET-SERVICE]
                 [,INSTALL-OPTION]
```

```
COMMAND          OPERANDS
FETCH            OBJECT-KEY,
                 OBJECT-TYPE,
                 [,TARGET-SERVICE]
                 [,CHECKOUT-OPTION]
```

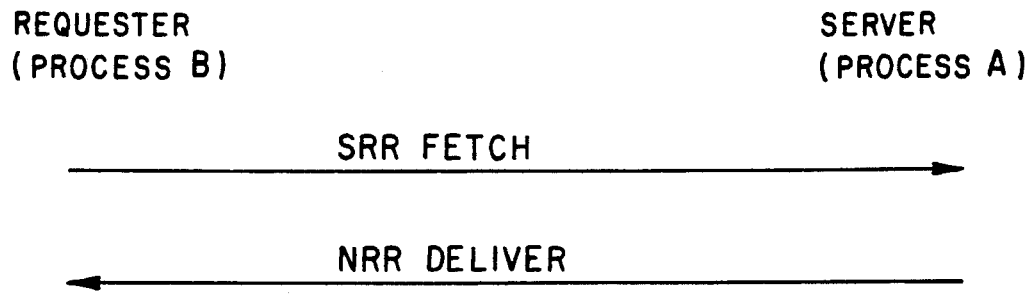
FIG. 5A
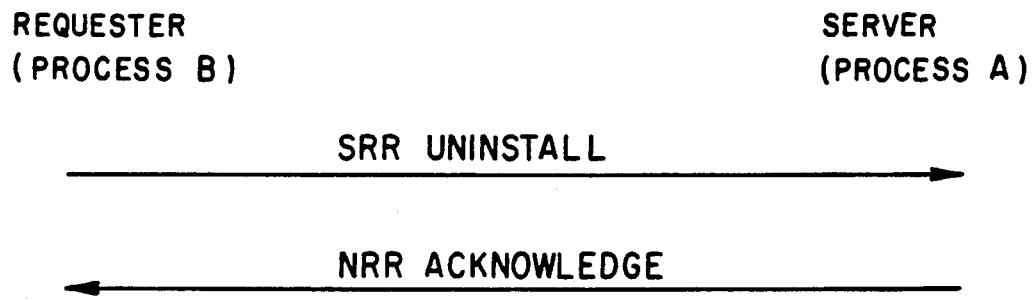
FIG. 6
FIG. 6A

NAME OF TABLE

DESCRIPTOR

IDENTITY
FIELD TYPE    NUM
TYPE PARMS    3
EXTENT/DIM    4
EXTENT/DIM    11

DATA 123 756 111 776 456 711 476 008 234 800 234
765 274 000 278 234 070 237 111 856 181 567
123 457 711 477 456 117 567 877 486 118 765
765 234 090 987 238 000 734 000 838 267 777

*FIG. 7*

TABLE MANIPULATIONS FOR ENTERPRISE SPECIFIC SEARCH TERMS

This application is a continuation of Ser. No. 453,542 filed on Dec. 20, 1989, now abandoned.

CROSS REFERENCES TO RELATED APPLICATIONS

This application is related to subject matter to the following application filed concurrently herewith and assigned to a common assignee:

Application Ser. No. 454,100 now abandoned filed by Cree, et. al. entitled "Enterprise Specific Search Terms Architecture".

The foregoing co-pending application is incorporated herein by reference.

FIELD OF THE INVENTION

This invention relates to expanding user access to a library of shared documents, and more particularly, to dynamically altering tables used for generating enterprise specific search terms for accessing documents.

BACKGROUND OF THE INVENTION

Electronic office systems frequently provide for the sharing of information. One technique for meeting this need is through the use of data repositories called electronic libraries. These electronic or shared libraries are capable of being accessed not only by users of a common network, but also other users of networks of interconnected pieces of equipment and programs. A user (end user) may be any person, device, program, or computer system that utilizes the systems for data processing and information exchange. With the increase in the number of users able to retrieve and store information in these libraries, the problem of retrieving information once it has been stored has increased. Enterprises storing and retrieving information in these shared libraries require quick and rapid access. An enterprise may be any economic organization. An enterprise may be a conglomerate, a company, a set of departments within a company, or a single department within a company. One prior art method for handling the exchange of information between an enterprise and a shared library is the Document Interchange Architecture (DIA).

DIA is a program-to-program communication architecture which defines the protocols and data structures, which when followed or used by programmers, enables programs to interchange information such as documents and messages in a consistent and predictable manner. DIA is independent of the type of information that is stored in a shared library and provides a defined set of parameters that describes the contents of information being transmitted such as the name under which the information is filed, the authors, the subject of the information, the date the information was filed, and keywords. These DIA architected descriptors enable a document to be searched in the library by an enterprise or other end user.

However, the current definition of DIA does not allow an enterprise or end user to add unique descriptors to information stored in the shared library beyond DIA architected descriptors. As a result, an enterprise such as a bank is limited to searching the shared library using such DIA architected descriptors as author, subject matter, or date filed. The enterprise cannot issue searches using search terms with the semantics of "Bank Account ID" or "Loan Identifier". In the same way, a manufacturing enterprise cannot access the library using search terms with the semantics of "Parts" or "Inventory".

Consequently, what is needed is a method to allow an enterprise to define the syntax and semantics of search terms that are specific to that enterprise.

SUMMARY OF THE INVENTION

This invention relates to a method for dynamically altering search term tables used for building enterprise specific search term indices. The search term tables are the means of providing the document interchange system with such enterprise specific search term information as rules validation, synonym provisions, and standardization information. This invention discloses a method for installing search term tables into a shared library, means for retrieving copies of those tables from the library, means for removing (un-installing) the tables from the libraries and means for associating the table with a particular enterprise. This is accomplished through the creation of new commands, namely, the INSTALL, FETCH, and UNINSTALL commands. Utilization of these commands enable an enterprise to quickly add its unique descriptors to a shared library.

BRIEF DESCRIPTION OF THE DRAWINGS

FIG. 5A is the preferred response when the FETCH command is successfully executed.

FIG. 6 is a document interchange UNINSTALL command with its available operands for deleting parser and builder tables.

FIG. 6A is the preferred response when the UNINSTALL command is successfully executed.

FIG. 7 shows a parser table encoded using the Formatted Data Object Content Architecture.

DETAILED DESCRIPTION

Figure 1:
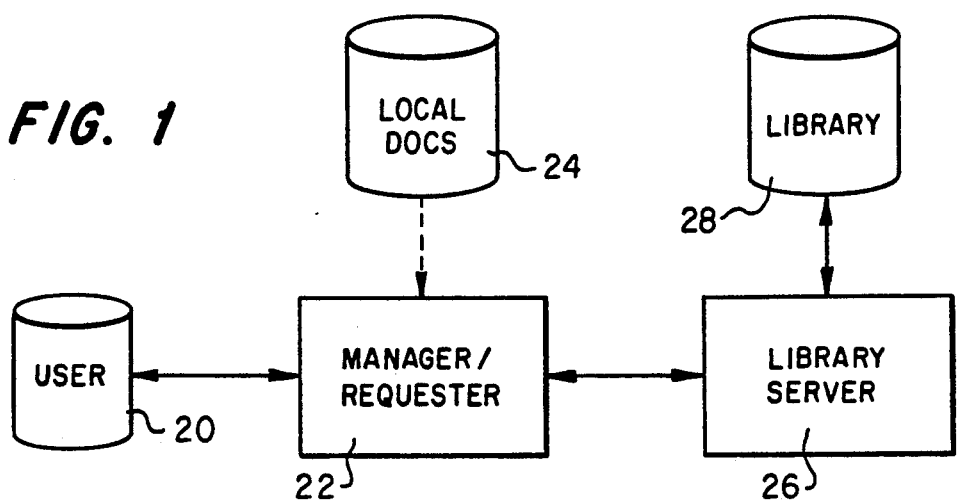
FIG. 1 is a block diagram of a document management system where this invention may be practiced.

FIG. 1 shows a document management system for exchanging documents stored in a shared library between the shared library and end users. A user 20 may store and retrieve documents from a shared library 28. A user (end user) may be any person, device, program, or computer system that utilizes the system for data processing or information exchange. The library 28 is capable of being accessed simultaneously by other users and therefore represents a common repository or shared resource. Unlike the shared library 28, a user's personal or private documents are stored in a local resource 24. This local storage resource 24 is usually not shared with other users. A user 20 accesses his local storage 24 through the manager/requestor 22. The manager/- requestor 22 also interfaces with the library server 26 which controls user's access to the shared library 28. When a user files a document in the document library 28, the library server 26 constructs parameters or descriptors that describe the contents of the information being stored in the library.

Figure 2:
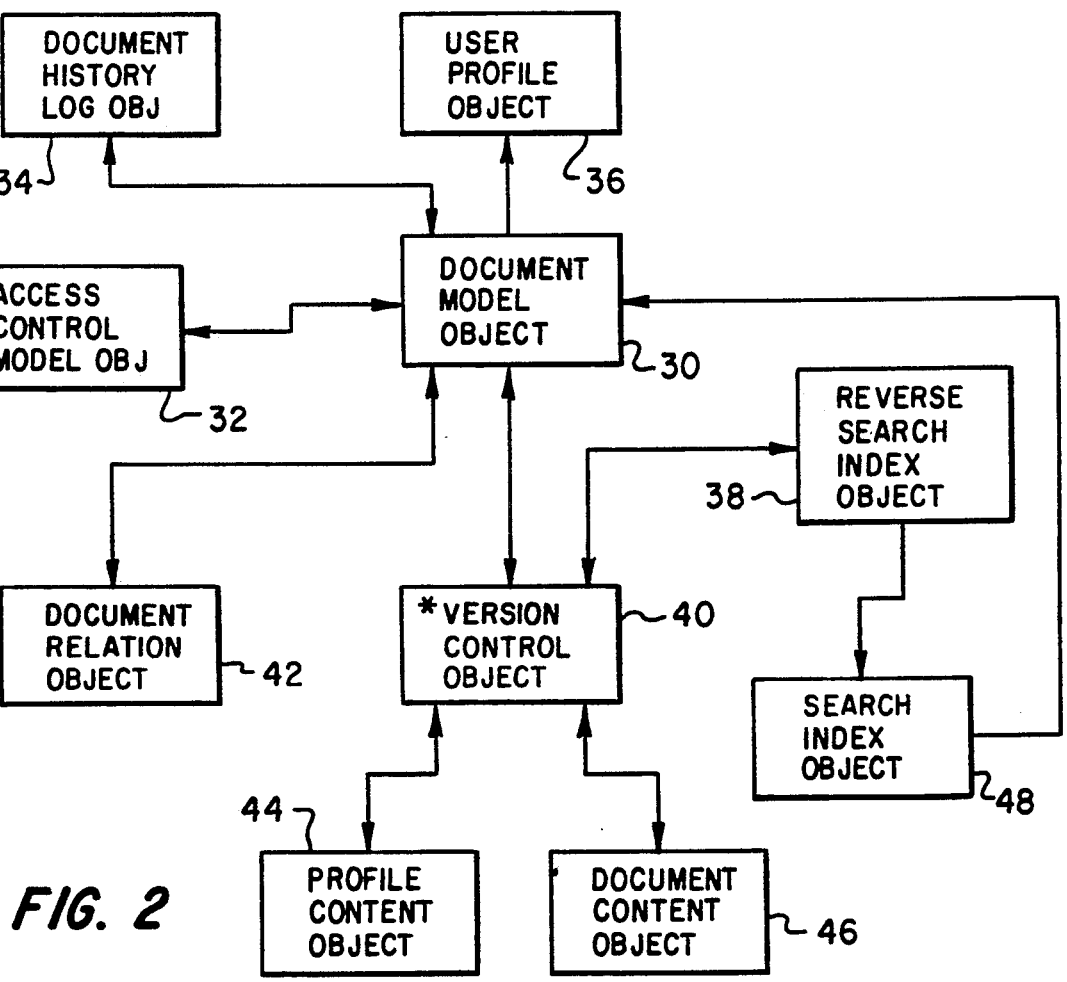
FIG. 2 is a basic document model created for each document filed in the library of the system shown in FIG. 1.

Referring to FIG. 2, a basic document model is shown for information stored in the library 28 shown in FIG. 1. This document model is created by the library server 26 and is stored with each document. While it is not necessary to implement the basic document model explicitly to support DIA library service architecture, there is the requirement that a design be mapped to these models, or to a subset of them.

The User Profile Object 36 (UPO) is not part of the DIA document model, but is instead an object referred to by the DIA document model. The User Profile Object 36 is created when the users represented are logged members of an Office System network. It identifies a user and contains information about the user such as aliases, services authorized to the user, default accounting information, and other user-specific information.

The Document Model Object 30 is the heart of the DIA document model and is logically the first object created when a document is filed for the first time in a document library. It contains information concerning ownership and attributes of a particular document. More specifically, it contains document instance attributes, such as whether the document is editable or not-editable; the maximum number of versions; and the action to be taken if the user has attempted to edit a document that cannot be edited. In addition, the Document Model Object 30 may contain any of the following information;

1) Document level locking information indicating the user who has checked a document out of the library for updating;

2) Indications that a document contents have been removed from direct control of the library server;

3) Directions to a library administrator to remove parts or restore parts of a document to library service control;

4) Time and date information removed from direct control of the library server;

5) Location of information removed from direct control of the library server; and 6) Optional information for archival purposes.

The Access Control Model Object 32 (ACMO) is created when a document is filed for the first time into a DIA library. The principal purpose of the Access Control Model Object 32 is to consolidate information to be used in determining non-owner access to the document. It contains access control information such as whether the document is capable of being accessed by any one (public), whether access is permitted to a limited number of explicitly specified users (private), or whether the information is shared with others. The Access Control Model Object 32 also contains information that governs the retention and disposal of the document.

The Document History Log Object 34 (DHLO) is optionally created when a document is filed in the library and the user wishes to record various activities on the document. For example, a user may wish to record the number of times the document was read and by whom.

The Document Relation Object 42 (DRO) is created when a document is first filed in the library. Its purpose is to describe the logical relationships between a document and other related or grouped documents. For example, the DIA architecture allows folder documents to be created that contain other documents. When such a relationship exists, then each document contained within the folder has a pointer entry called a Library Assigned Document Name (LADN) in the Document Relation Object 42.

The Version Control Object 40 (VCO) is created when a document is first filed into the library and contains information for several objects that may comprise a single named version of a document. It provides space for version naming, version level locks, and other version related level process controls.

The Profile Content Object 44 (PCO) is created when a document is first filed into the library and a user wishes to create sub-objects for performance or other reasons. The Profile Content Object 44 is the repository for profile information related to the sub-objects.

The Document Content Object 46 (DCO) is created when a document is first filed into the library and provides storage for the document contents. In addition, the Document Content Object 46 provides storage for saving information concerning the actual size of the document in various units of measurement.

The Search Index Object 48 (SIO) contains entries used in searching within a document. The entries are placed in the SIO 48 as a result of the following sequence of actions on other objects. The basic Document Model Object 30 is first created as part of processing a FILE command. The Library Server then scans the Profile Content Object 44, the Document Relation Object 42, and the Access Control Model Object 32 to find terms to be used to support a parametric SEARCH. As each search term is identified, an entry is made in the Search Index Object 48 whose name includes the parametric search term value and semantics. If no SIO 48 exists when the Library Server scans the aforementioned objects, one is created and the entries placed therein as if the Search Index Object 48 always existed.

The Reverse Search Index Object 38 (RSIO) exists to support the removal of Search Index Object 48 entries when a document is removed from the library by a DELETE command. Entries for parametric search terms are placed in the RSIO 38 at the same time they are being made in the Search Index Object 48.

Figure 3:
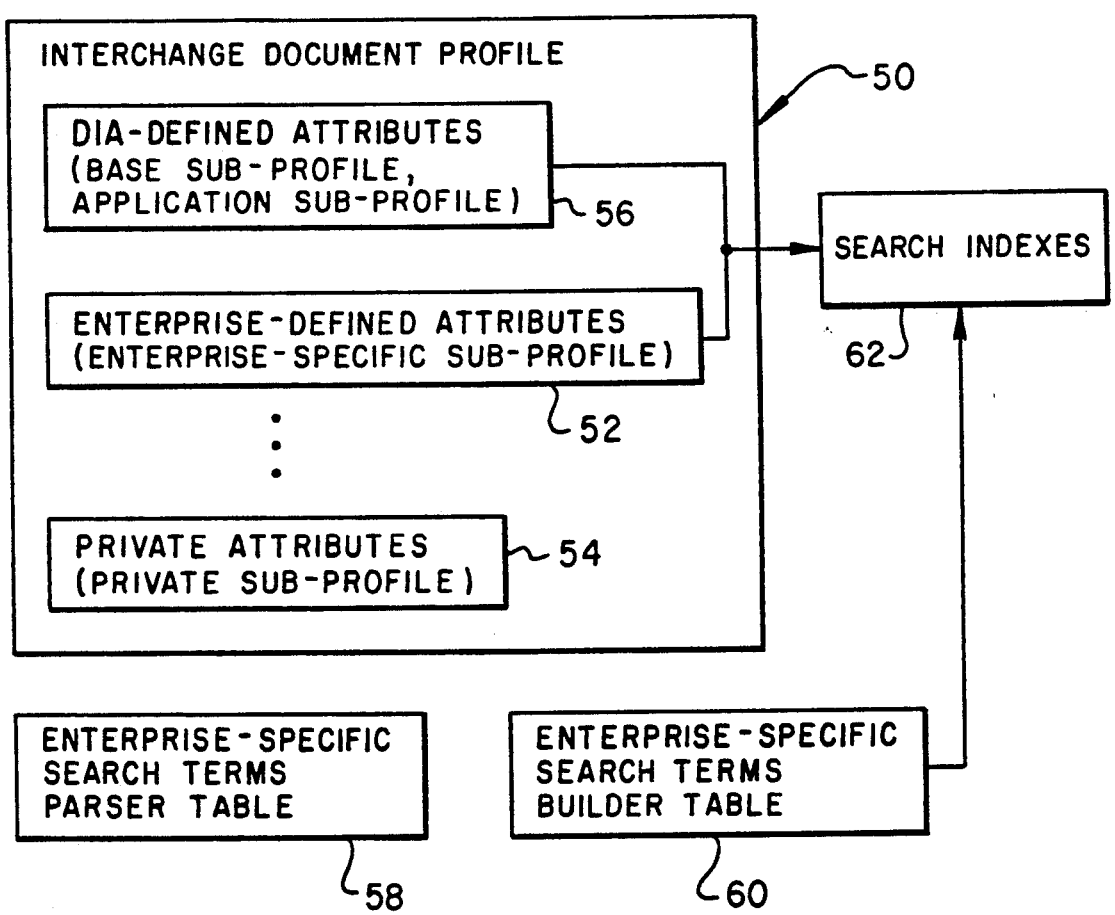
FIG. 3 is a block diagram of the Interchange Document Profile stored in the Profile Content Object.

Turning to FIG. 3, a method of adding enterprise specific search terms to a document stored in a shared library is disclosed. The Interchange Document Profile 50 (IDP) and tables 58, 60 are the required components for building the search indices 62 which will be stored with a document in the shared library. The IDP 50 contains the DIA-defined attributes 56, enterprise specific attributes 52, and private attributes for building the search index. The DIA attributes 56 are used to create the DIA architected term such as, the name under which the information is filed, the authors, the subject of the information, and the date the information was filed in the document history log. The enterprise defined attributes 52 are placed in the enterprise specific sub-profiles in the IDP 50. They are used along with the parser table 58 and builder table 60 to generate such enterprise specific terms as "Bank Account ID" or "Loan Identifier", for example, if the enterprise was a bank. The parser table 58 and builder table 60 must be present before the search indices 62 can be generated. These tables represent the formatting information required to parse or build DIA search date streams. Private attributes for other functions may follow the DIA and enterprise defined attributes. These private attributes are placed in private sub-profiles 54.

Ease of use in generating Enterprise Specific Search Terms (ESST) was provided by making the parser 58 and builder 60 tables easy to process, in an architected format to meet the DIA format, table driven, and dynamically tailored to meet an enterprise requirements. This was accomplished by using Formatted Date Object Content Architecture (FDOCA) encoding for the tables. FDOCA is an IBM defined object content architecture that allows users to express information about the structure and meaning of data. FDOCA makes it possible to have data processing type data and their descriptors in one file.

Turning to FIG 7, an example of an Enterprise Specific Search Term Parser Table is shown. A 4 by 11 array of 3-digit numbers is shown representing data. In addition, a descriptor for the data is shown indicating that the data type is some kind of numeric and that there are several dimensions. The descriptor indicates that a first extent per dimension is 4 and a second extend per dimension is 11. There is also a descriptor entry for type parameter which is indicated as having a length of 3 bytes. As indicated by this example, FDOCA makes it possible to have both data processing type data and their descriptors in the same table.

The tables must indicate the extra library services desired. If the tables do not indicate the extra library services, then that service will not be provided. Without the ESST tables, the Enterprise Specific Search Terms sub-profiles 52 in FIG. 3, will be skipped and stored as byte perfect without being included in the search indices 62.

The library server 26, FIG. 2, checks for the presence of the Enterprise Specific Search Terms (ESST) tables before building the search indices 62 shown in FIG. 3. If the tables have not been properly installed, no search indices will be built. If the tables have been properly installed, the library server will build the search indices for the ESST based on the validation rules, synonym provisions, and standardization information found in the parser table 58 and the builder table 60. This invention permits an enterprise's end user to load validation tables based on unique enterprise end user requirements. Therefore, an enterprise's end user is given the capability to change to the validation rules per the enterprise requirements, while maintaining an interchangeable DIA defined syntax and format.

Figures 4, 4A, 5:
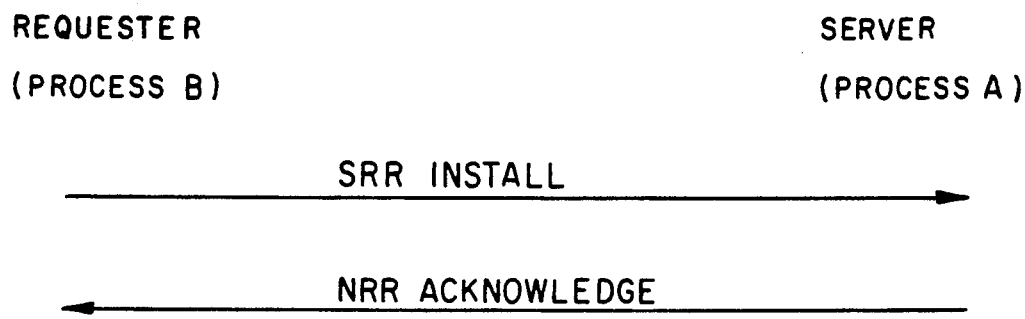
FIG. 4 is a document interchange INSTALL command with its available operands for installing the parser and builder tables shown in FIG. 3.
FIG. 4A is the preferred response when the INSTALL command is successfully executed.
FIG. 5 is a document interchange FETCH command with its available operands for providing an end user with means for retrieving the parser and builder tables for viewing or for updating.

Turning to FIG. 4, this invention provides a new document interchange management command for installing parser and builder tables. The INSTALL command is used to install a library control object into a DIA library. As used in this invention, a library control object is synonymous with the parser/builder tables used for creating search terms specific to an enterprise. The library control object can only be installed by an authorized library administrator. Using this command, the library administrator can perform all of the following functions: 1) identify the type of the control object; 2) establish any associations with the object; 3) identify the library where the object is to be installed; 4) indicate whether the object is newly installed; 5) indicate if the object is to be merged with an existing object; or 6) determine if the object is to be a replacement for an existing object.

Returning again to FIG. 4, the operand field of the INSTALL command indicates the various options available to the system administrator. The IDENTIFIED-DATA (IDD) operand is required and specifies the object to be installed. The OBJECT-KEY operand is also required and identifies the enterprise that is associated with the object specified in the IDD operand. The OBJECT-TYPE is also a required operand and identifies the document type of the object. The OBJECT-KEY and the OBJECT-TYPE operands are used to uniquely identify the object installed in the library. Only one OBJECT-TYPE operand may be supplied by the library administrator.

Two optional operand values are allowed in the INSTALL command. The TARGET-SERVICE operand, if present, specifies the library name where the object is to be installed. The INSTALL-OPTION operand specifies whether the object is newly installed, to be merged with an existing object, or to replace an existing object. The default state of this operand is that the object is newly installed.

When the INSTALL command is used to install a library control object (parser/builder table) in the library, successful completion of the command is indicated with the return of an ACKNOWLEDGE command as shown in FIG. 4A. Successful completion status is returned in the EXCEPTION-CODE operand of the DIA ACKNOWLEDGE command.

Once an object is installed in a DIA library, an end user is permitted to retrieve a copy for viewing or updating. This is accomplished through use of the FETCH command shown in FIG. 5. The end user retrieving the object must have at least "read" authority to the object. While the end user may retrieve and view a copy of the original object, only the authorized library administrator is permitted to retrieve and update the original object.

Referring again to FIG. 5, the available operands for the FETCH command will be examined. The OBJECT-KEY and OBJECT-TYPE are required operands. The OBJECT-KEY operand identifies an enterprise and only one can be supplied. The OBJECT-TYPE operand identifies the document type of the object. These required operands are used together to uniquely identify the object installed in the library. The TARGET-SERVICE and CHECKOUT-OPTION operands are optional. The TARGET-SERVICE operand specifies the library name where the object is to be found and defaults to the library server. The CHECKOUT-OPTION operand specifies whether the object is for viewing or for updating. The default of the CHECKOUT-OPTION is for viewing only.

When a table is successfully retrieved from the target library, a DELIVER command is sent at the conclusion of processing by the library server. FIG. 5A illustrates sending of the FETCH command and ultimately, its successful completion as indicated by the DELIVER command. As required under DIA architecture provisions, the DELIVER Document Interchange Unit (DIU) contains the requested information.

When library control objects are no longer needed by a particular enterprise, they may be removed from the DIA library using the UNINSTALL command. The library control objects can only be deleted by an authorized library administrator and cannot be deleted by regular DIA library end users. The UNINSTALL command is shown in FIG. 6 along with its available operands. The OBJECT-KEY and OBJECT-TYPE are required operands. The OBJECT-KEY operand identifies an enterprise and only one can be supplied. The OBJECT-TYPE operand identifies the document type of the object and along with the OBJECT-KEY operand uniquely identifies the object installed in the library. Only one OBJECT-TYPE operand may be supplied.

When a table has been successfully deleted from the target library, the library server response with an ACKNOWLEDGE command. The sequence of the UNINSTALL and ACKNOWLEDGE commands is shown in FIG. 6A.

In summary, this invention provides a method of allowing parser and builder tables to be dynamically changed per enterprise requirements. Tables can be installed into a library and removed when they are no longer required. Copies of currently installed tables can be provided to any end user with proper read authority. This is accomplished through the creation of the INSTALL, FETCH, and UNINSTALL commands. The INSTALL command allows a table to be installed in a library by providing means for identifying the type of table, passing operands that define an association with an enterprise, and indicating whether the table is newly installed, a replacement for an existing table, or to be merged with an existing table. The FETCH command provides for the retrieval of a copy of a table from the library for viewing or updating. Finally, the UNINSTALL command provides for the deletion of a table from the library once it is no longer needed. In addition to the new commands, this invention provides two new operand fields for library control. These operands are used to uniquely identify the enterprise that is associated with a table. The OBJECT-KEY operand is used to identify the enterprise that is associated with the table and the OBJECT-TYPE operand is used to identify the type of the table. The commands along with their available operands facilitate the generation of tables necessary to generate enterprise specific terms for document interchange systems.

While the invention has been particularly shown and described with reference to preferred embodiments thereof, it will be understood by those skilled in the art that various changes in form and details may be made therein without departing from the spirit and scope of the invention.

What I claim is:

1. A method of installing a table in a document interchange system for the generation of an enterprise specific search term to be placed in a shared library, said method comprising the steps of:
   identifying the type of said table and passing an operand, defining its association with said enterprise specific search term; and
   storing said table in said library and indicating whether said table is newly installed in said document interchange system.

2. A method of installing a table into a shared library in a document interchange system where said table contains specific information for a user, said method comprising the steps of:
   identifying said table to be installed in said shared library; and
   identifying said user as an owner of said table to be installed in said shared library; and
   identifying said table as having a document type acceptable for installation into said library.

3. A method of retrieving an installed table in a shared library in a document interchange system for viewing and updating by a user; said method comprising the steps of:
   identifying said user as an owner of said installed table in said shared library; and
   identifying said installed table in said shared library as having a particular document type; and
   providing said table for viewing and updating by said user.

4. A method of deleting an installed table in a shared library in a document interchange system; said method comprising the steps of:
   identifying said user as an owner of said installed table in said shared library; and
   identifying said installed table in said shared library as having a particular document type; and
   removing said table when said user is the owner and said installed table is of said particular document type.

5. A system for dynamically altering a search term index in a document interchange system within a data processing means, said search term index having a fixed set and a variable set of entries for retrieving a plurality of documents assessable by a plurality of users forming an enterprise;
   means for identifying to said data processing means said fixed set of entries to said plurality of document;
   means coupled to said identifying means for generating said variable set of entries to said plurality of documents;
   means responsive to said means for identifying for emitting a first search term index corresponding to said fixed set of entries to said plurality of document.

6. A system for dynamically altering a search term index in a document interchange system within a data processing means as recited in claim 5, wherein said means for generating said variable set of entries further includes means for parsering a table of enterprise information associated with said variable entries and emitting a second search term index corresponding to said fixed set of entries and said variable set of entries.

7. A system of dynamically altering a search term index in a document interchange system within a data processing means as recited in claim 6 wherein said table of enterprise information is provided in a document interchange format.

* * * * *